Figure 23:
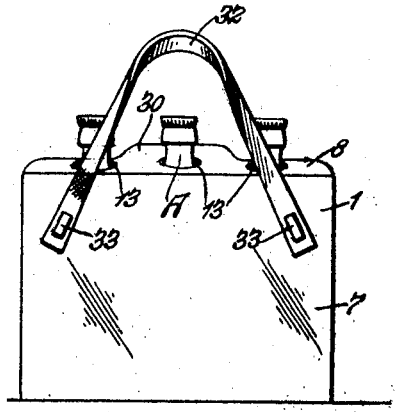

July 10, 1934.   G. S. EVERHART   1,965,886
BOTTLE CARRIER
Filed Dec. 14, 1931   5 Sheets-Sheet 1
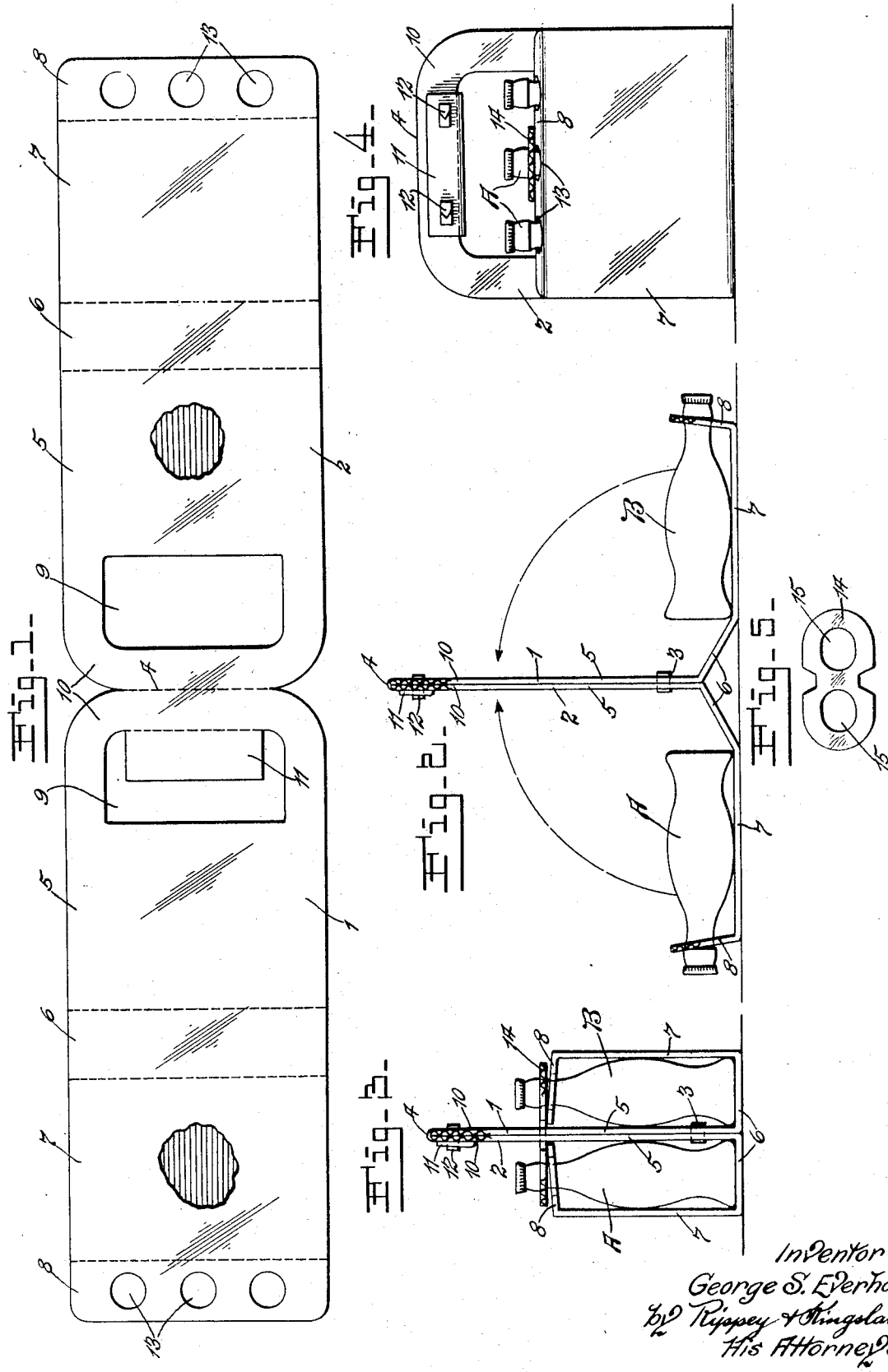
Inventor
George S. Everhart
by Rippey & Kingsland
His Attorneys.

July 10, 1934. G. S. EVERHART 1,965,886
BOTTLE CARRIER
Filed Dec. 14, 1931  5 Sheets-Sheet 2
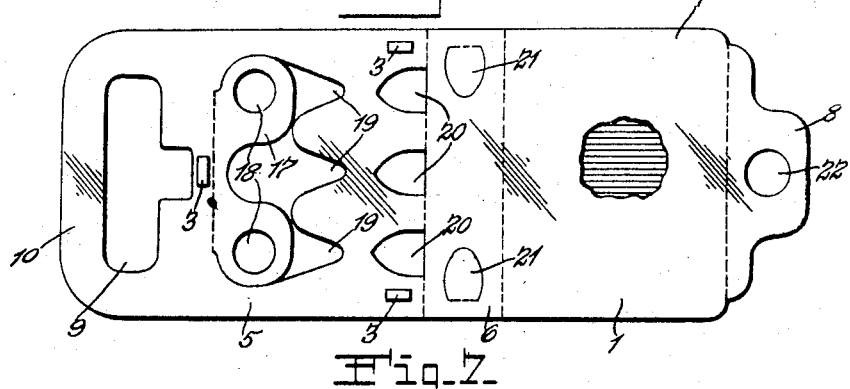
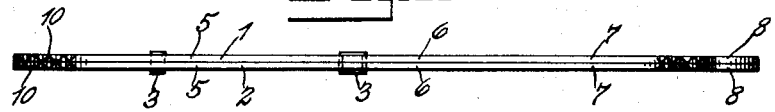
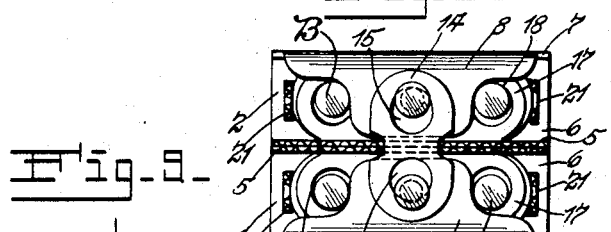
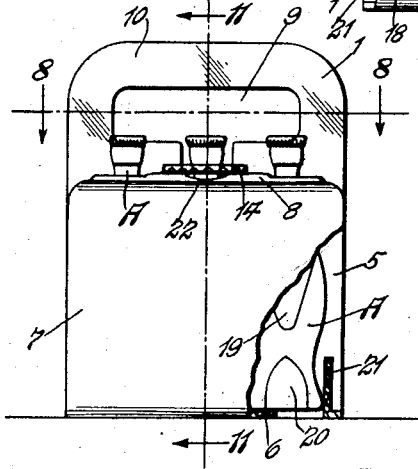
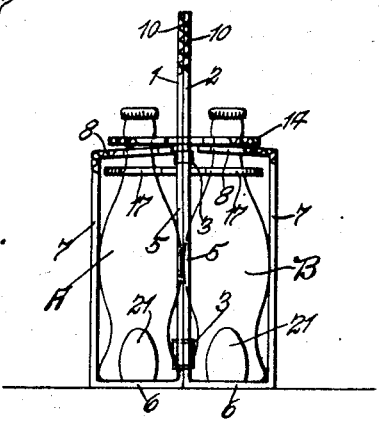
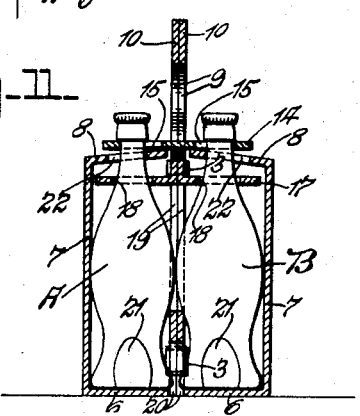
Inventor
George S. Everhart
by Rippey & Kingsland
His Attorneys July 10, 1934.  G. S. EVERHART  1,965,886
BOTTLE CARRIER
Filed Dec. 14, 1931  5 Sheets-Sheet 3
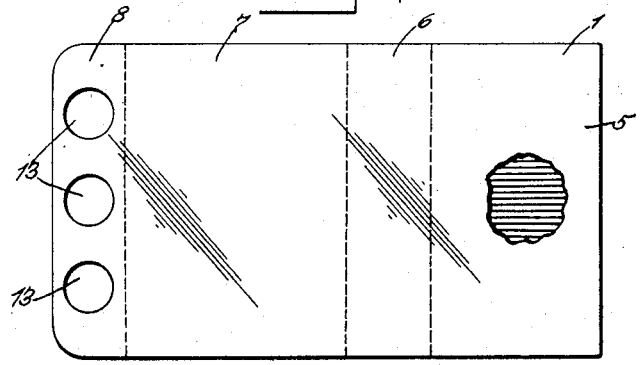
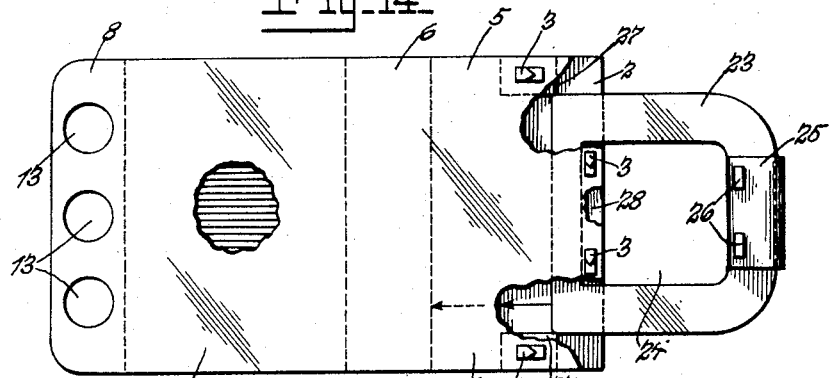
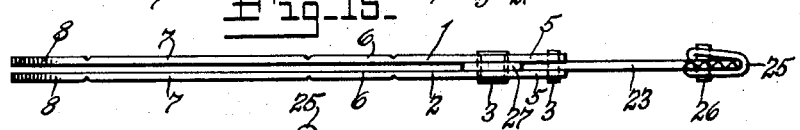
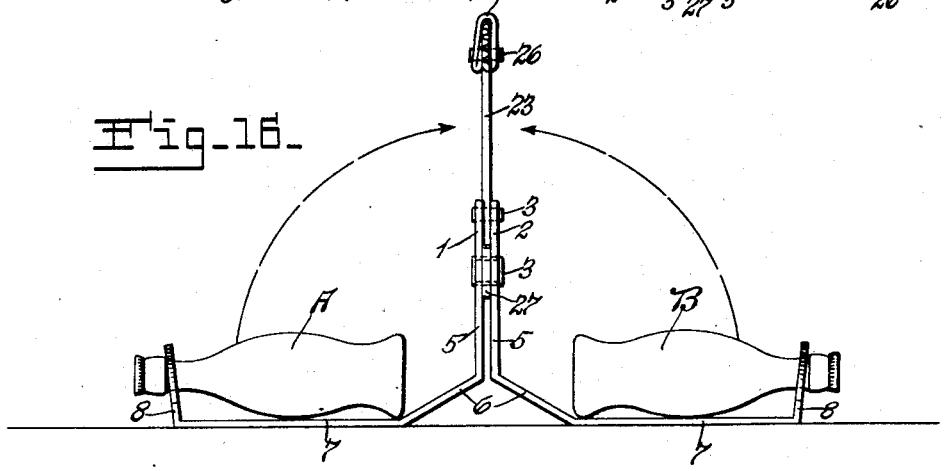
Inventor
George S. Everhart
by Rippey & Kingsland
His Attorneys July 10, 1934.　　　　G. S. EVERHART　　　　1,965,886
BOTTLE CARRIER
Filed Dec. 14, 1931　　　5 Sheets-Sheet 4
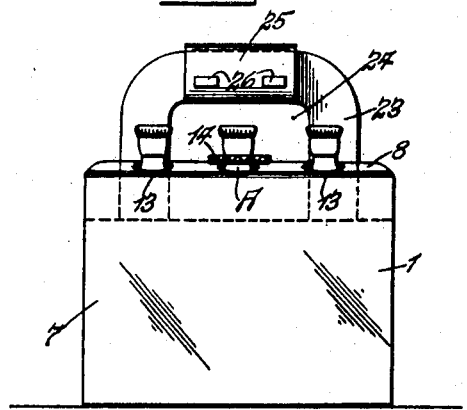
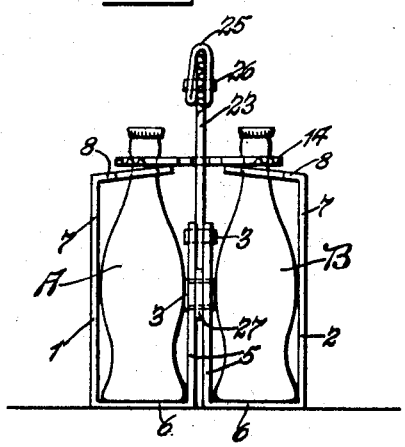
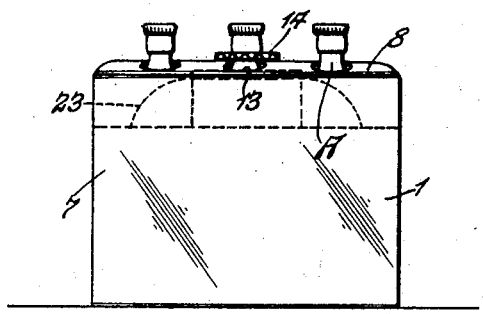
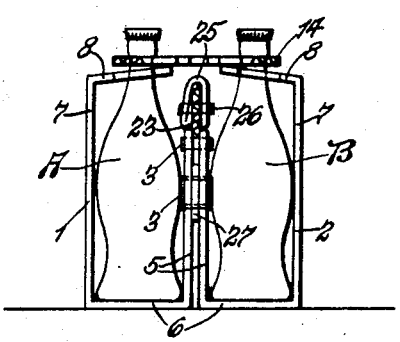
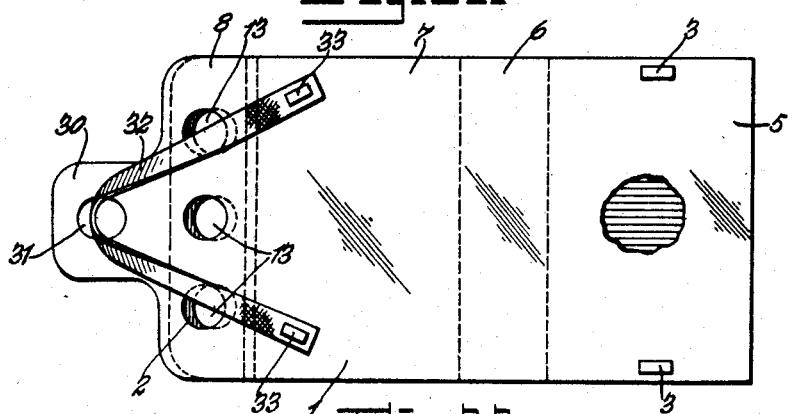
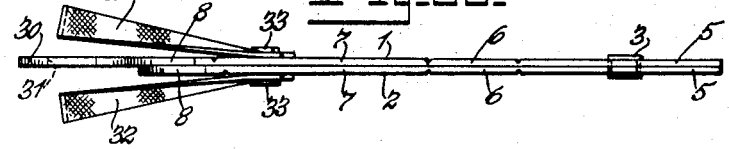

July 10, 1934.　　　　G. S. EVERHART　　　　1,965,886
BOTTLE CARRIER
Filed Dec. 14, 1931　　　5 Sheets-Sheet 5

Inventor
George S. Everhart
by Rippey & Kingsland
His Attorneys.

Patented July 10, 1934

1,965,886

UNITED STATES PATENT OFFICE 1,965,886

BOTTLE CARRIER

George S. Everhart, Terre Haute, Ind.

Application December 14, 1931, Serial No. 580,827

16 Claims. (Cl. 224—45)

This invention relates to improvements in bottle carriers and consists in the novel construction hereinafter disclosed.

An object of the invention is to provide a carrier for bottles formed from a pair of cutout folded blanks of corrugated paper board, or the like, in which a plurality of bottles may be mounted and supported in two parallel rows, which carrier is provided with a handle member and is economical of construction, simple in use and durable in service.

Another object of the invention is to provide a device of the class described having a handle member which may be collapsed beneath the top of the carrier in one adjustment and extended in another adjustment so that the structure may be used either as a case for packing the bottles or as a case for manual transportation of the same.

Additional detailed advantages of the construction will be apparent from the following description taken in connection with the accompanying drawings in which:—

Figs. 1 to 4, inclusive, illustrate a simple embodiment of the invention; Fig. 1 being a plan view of the blanks; Fig. 2 an end elevation of the case in opened position; Fig. 3 an end elevation of the case in closed position; and Fig. 4 a side elevation of the case in closed position.

Fig. 5 is a plan view of a connecting element.

Figs. 6 to 11, inclusive, are views of another embodiment of the invention; Fig. 6 being a plan view of a blank; Fig. 7 an edge view of a pair of blanks in superimposed position; Fig. 8 a sectional view on line 8—8, Fig. 9; Fig. 9 a side elevation; Fig. 10 an end elevation; and Fig. 11 a vertical section on line 11—11, Fig. 9.

Fig. 12 is a perspective view of a connecting element similar to that illustrated in Fig. 5 but of a different form and material.

Figs. 13 to 20, inclusive, illustrate another embodiment of the invention and particularly illustrate that part of my invention which relates to the adjustable handle. Fig. 13 is a plan view of a blank. Fig. 14 is a plan view of the container in an unfolded or knocked-down condition and Fig. 15 is an edge view of the same. Fig. 16 is an end view of the carrier in an open position. Fig. 17 is a side elevation of the case in closed position with the handle extended and Fig. 18 is an end elevation of the same. Fig. 19 is a side elevation of the carrier with the handle in collapsed position and Fig. 20 is an end elevation of the same.

Figure 24:
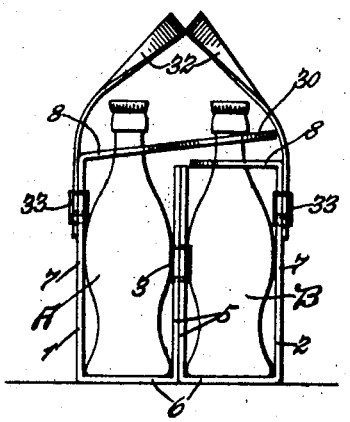
Figure 25:
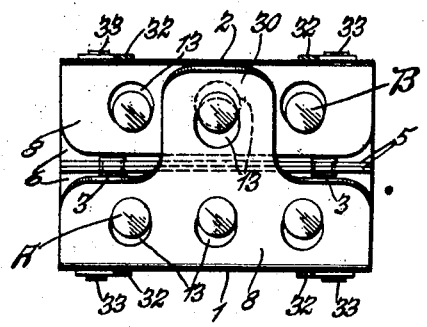

Figs. 21 to 25, inclusive, illustrate further embodiments of the invention, particularly with reference to the connecting element and the handle. Fig. 21 is a plan view of the case in knocked-down condition and Fig. 22 is an edge view of the same. Fig. 23 is a side elevation of the case; Fig. 24 is an end elevation, and Fig. 25 is a plan view of the same.

Figure 26:
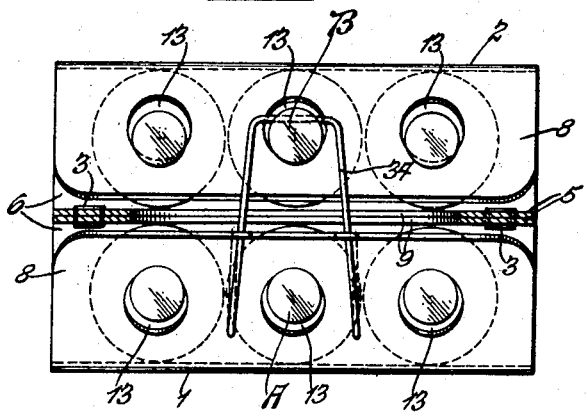

Fig. 26 illustrates an optional form of connecting element.

A carrier is formed from a pair of blanks 1 and 2 placed in superimposed position and secured together by clamping members 3. In the embodiment illustrated in Fig. 1 the blanks 1 and 2 may be made integral and from a single strip of material, the two blanks being joined together as shown by the dotted line 4. It is contemplated that the carrier be constructed from sheets of relatively stiff material and corrugated paper board is recommended for this purpose. Each of the blanks comprises a vertical section 5 which is adapted to form a handle and an intermediate wall of the carrier, a section 6 forming a bottom, a section 7 forming an outer side wall, and a section 8 forming a top flap. The vertical section 5 has a cut-out portion 9, thus forming a bar 10 adapted for manual engagement. In the embodiment specifically illustrated in Fig. 1 a reenforcing flap 11 is formed by the cut-out 9 in the blank 1 and may be folded over as illustrated in Figs. 2, 3 and 4. Staples 12 are placed through the reenforcing member 11 and the bars 10.

The flaps 8 have cut-outs 13 providing holes adapted to be fitted over the tops of bottles A and B and engaging the necks thereof. The carrier is adapted to take two parallel rows of bottles arranged on each side of the intermediate wall 5. As specifically shown in the drawings, the carrier is arranged to take a total of six bottles but it will be understood, of course, that it is not limited to such a number.

A connecting member 14 has a pair of holes 15 and is adapted to be fitted over a bottle A and a bottle B, thus holding the carrier in assembled condition, as shown in Figs. 3 and 4. The connecting member 14 may be and is, as shown in Figs. 3 and 4, constructed of corrugated paper board. Or, as shown in Fig. 12, the connecting member 14 may be constructed of metal and have formed on its side claws 16 in order that the member may be conveniently used as a bottle opener.

The embodiment illustrated in Fig. 6 is quite similar in construction to that illustrated in Fig. 1, having the blanks 1 and 2 each of which has a vertical section 5 providing a handle and an intermediate wall, a bottom section 6, a side section 7 and a flap section 8. The vertical section 5 is cut-out, however, in a novel manner to form a flap 17 having holes 18 to engage the end bottles of the row. Cut-out sections 19 are made in the vertical section 6, forming sockets in which the side of the bottle fits. The vertical section 5 also has cut-out portions 20 near the bottom which form sockets to receive the bottom of the bottles.

The bottom section 6 of each of the blanks has small flaps 21 struck out and turned up to fit at the end of the row of bottles and thus the bottles are held in assembled condition without danger of falling from the case.

The end flaps 8, in the embodiment shown in Figs. 6 to 11, may have only one hole 22 which passes over the neck of the center bottle in the row.

It will be obvious that the modification illustrated in Figs. 6 to 11 provides means whereby the bottles may be held more firmly than when the sockets 19 and 20 and the flaps 21 are not provided.

The modification illustrated in Figs. 13 to 20 is directed to the arrangement of an adjustable handle which is so positioned that it may be moved to extended position as shown in Figs. 17 and 18, or in collapsed position as shown in Figs. 19 and 20. Each of the blanks 1 and 2 are formed with a vertical section 5, a bottom section 6, a side wall section 7 and a flap section 8. The vertical section 5 is formed without, however, the integral handle portion. A handle blank 23 is formed with a cut-out portion 24 and with a reenforcing flap 25 which may be turned over and fastened with staples 26. Shims 27, which may be of corrugated paper board, are placed between the blanks 1 and 2 and the staples 3 passed therethrough. A shim 28 may also be similarly placed and secured, and the handle blank 23 inserted between the blanks 1 and 2 in such a manner that the shim 28 is within the cut-out portion 24 and forms a stop for the bottom of the handle blank. It will be readily seen that the handle 23 may be extended, as shown in Figs. 17 and 18, or it may be collapsed, as shown in Figs. 19 and 20. This arrangement makes the case convenient for stacking and at the same time provides a handle which may be readily extended.

The embodiment illustrated in Figs. 21 to 25 is directed to the handle and the connecting element. In this embodiment each of the blanks is provided with a vertical section 5, a bottom section 6, a side wall section 7 and a flap section 8. The blank 1 has, however, a flap 30 extending beyond and integral with the flap 8 and provided with a hole 31 for engaging a bottle in the row opposite that engaged by the holes 13 in its flap 8. This modification eliminates the necessity for a separate connecting element 14 as illustrated in the preceding figures.

In the modification shown in Figs. 21 to 25 the vertical section 5 of the blanks 1 and 2 does not have any handle portion. Instead, a pair of straps 32 are fastened by staples 33 to the side sections 7 of the blanks.

Fig. 26 illustrates an alternate form of connecting member which comprises a wire yoke 34 secured to the flap 13 of the blank 1 and arranged to pass over and engage the neck of a bottle in the adjacent row.

It will be obvious that parts of the invention may be used without the whole and that various changes may be made in construction, within the scope of the appended claims, without departing from the spirit of the invention.

I claim:

1. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together at their immediate wall portions, and a connecting member connecting the upper and outer ends of said blanks by engagement with the neck of a bottle engaged by one of said flaps and cooperatively associated with the other flap.

2. A bottle carrier including a pair of blanked out sheets of relatively stiff material, each of said sheets having consecutively portions forming a handle, an intermediate wall, a bottom, a side wall, and a top flap which is adapted to fit over and engage the neck of one or more of a row of bottles resting on said bottom portion and adjacent the intermediate wall, means for connecting said sheets together at their intermediate wall portions, and a member connecting the upper and outer ends of said blanks by engagement with the neck of a bottle engaged by one of said top flaps and cooperatively associated with the other flap.

3. A bottle container including a blanked out sheet of relatively stiff material, said sheet having oppositely disposed portions integral with each other, each of said portions having consecutively sections forming an intermediate wall, a bottom, a side wall, and a top flap which is adapted to fit over and engage the neck of one or more of a row of bottles resting on said bottom section and adjacent the intermediate wall, means for connecting said portions together in adjacent and parallel relationship at their intermediate wall sections, and a member connecting the upper and outer ends of said blanks by engagement with the neck of a bottle engaged by one of said top flaps and cooperatively associated with the other flap.

4. A bottle container including a pair of blanked out sheets of relatively stiff material, each of said sheets having consecutively portions forming an intermediate wall, a bottom, a side wall, and a top flap which is adapted to fit over and engage the necks of bottles resting on the bottom portion and adjacent the intermediate wall, means for connecting said sheets together at their intermediate wall portions, and means for holding the container in closed position.

5. A bottle container including a pair of blanked out sheets of relatively stiff material, each of said sheets having consecutively a vertical section forming a handle and an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel relationship at their intermediate wall sections, and means for holding the container in closed position.

6. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel relationship at their intermediate wall portions, and a connecting member connecting the upper and outer ends of said blanks by engagement with the neck of a bottle in each row and which bottles are engaged by said top flaps.

7. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom and adjacent the intermediate wall, means for connecting said sheets together in adjacent and parallel relationship at their intermediate wall portions, and an 8-shaped member connecting the upper and outer ends of said blanks by engagement with the neck of a bottle in each row which bottles are engaged by said top flaps.

8. A bottle carrier including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel position at their intermediate wall portions, a handle member engaging said intermediate portions, and means for holding the container in closed position.

9. A bottle carrier including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel position at their intermediate wall portions, a handle integral with said intermediate portions, and means for holding the container in closed position.

10. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel relationship at their intermediate wall portions, a flap struck from each of said intermediate wall portions integral therewith and adapted to fit over and engage the neck of one or more of a row of bottles resting on said bottom portion, and means for holding the container in closed position.

11. A bottle container including a pair of blocked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel relationship at their intermediate wall portions, said sheets having pieces blanked out of the said wall portions providing sockets for the bottles, and means for holding the container in closed position.

12. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom portion and adjacent the intermediate wall, means for connecting said sheets together in adjacent and parallel relationship at their intermediate wall portions, flaps struck from and integral with the bottom portions adapted to form abutments for the end of the bottle rows, and means for holding the container in closed position.

13. A bottle carrier including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom wall and adjacent the intermediate wall, means for connecting said sheets together in adjacent and parallel relationship at their intermediate wall portions, a handle member engaging said intermediate wall portions and adapted to be depressed below the top of the carrier or extended for manual engagement, and means for holding the container in closed position.

14. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom wall and adjacent the intermediate wall, means for connecting said sheets together in adjacent and parallel relationship at their intermediate wall portions, and a flap integral with one of said top flap portions and adapted to fit over and engage the neck of a bottle engaged by the other top flap.

15. A bottle container including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom wall and adjacent the intermediate wall, means for connecting said sheets together in adjacent and parallel relationship at their intermediate wall portions, and a yoke member secured to one of said top flap members and adapted to fit over and engage the neck of a bottle engaged by the other top flap.

16. A bottle carrier including a pair of blanked out sheets of relatively stiff material, each of said sheets having consecutively portions forming an intermediate wall, a bottom, a side wall, and a top flap which is adapted to fit over and engage the neck of one or more of a row of bottles resting on said bottom wall and adjacent the intermediate wall, means for connecting said sheets together in adjacent and parallel relationship at their intermediate wall portions, and straps secured respectively to each of said sheets at the side wall portion and adapted for manual engagement.

GEORGE S. EVERHART.